United States Patent [19]

Schieber

[11] 4,375,782
[45] Mar. 8, 1983

[54] COMPOSITE PISTON FOR INTERNAL COMBUSTION ENGINES

[75] Inventor: Gerhard Schieber, Bad Wimpfen, Fed. Rep. of Germany

[73] Assignee: Karl Schmidt GmbH, Neckarsulm, Fed. Rep. of Germany

[21] Appl. No.: 138,462

[22] Filed: Apr. 8, 1980

[30] Foreign Application Priority Data

Apr. 10, 1979 [DE] Fed. Rep. of Germany ....... 2914456

[51] Int. Cl.³ ............................................. F02F 3/00
[52] U.S. Cl. ..................................... 92/176; 92/220; 123/193 P
[58] Field of Search ................. 92/176, 216, 217, 218, 92/219, 220, 221, 255, 257, 259, 208; 123/193 P; 29/156.5 R; 277/189.5

[56] References Cited

U.S. PATENT DOCUMENTS

| | | | |
|---|---|---|---|
| 1,191,247 | 7/1916 | Tippett | 92/257 |
| 2,057,758 | 10/1936 | Bernard | 92/220 |
| 2,294,519 | 9/1942 | Starr | 92/257 |
| 2,478,294 | 8/1949 | Madsen | 92/220 X |
| 3,136,306 | 6/1964 | Kamm | 92/217 X |
| 3,187,643 | 6/1965 | Pope | 92/176 |
| 4,083,292 | 4/1978 | Goloff | 92/176 |

FOREIGN PATENT DOCUMENTS

| | | | |
|---|---|---|---|
| 511690 | 6/1952 | Belgium | 92/255 |
| 278074 | 9/1914 | Fed. Rep. of Germany | 92/220 |
| 106677 | 6/1974 | Fed. Rep. of Germany | |
| 462490 | 11/1913 | France | 92/217 |
| 244427 | 4/1947 | Switzerland | 92/220 |

Primary Examiner—Gerald A. Michalsky
Attorney, Agent, or Firm—Sprung, Horn, Kramer & Woods

[57] ABSTRACT

A composite piston for internal combustion engines having a lower part and an upper part composed of ferrous material and joined together by a centering screw-threaded ring, is provided with the screw-threaded ring which comprises internal screw threads adjacent the lower rim thereof and an internal annular rib adjacent the upper rim thereof, the lower part of the piston has a corresponding annular recess adjacent its upper rim configured to enable the screw-threaded ring to be screwed onto the upper rim of the lower part of the piston and the upper part has an annular recess in the upper rim thereof configured to receive the internal annular rib, when the screw threaded ring is screwed onto the lower part, with the axially extending and radially extending boundary surfaces of the internal rib forced against the confronting boundary surfaces of the annular recess of the upper part.

3 Claims, 2 Drawing Figures

COMPOSITE PISTON FOR INTERNAL COMBUSTION ENGINES

BACKGROUND OF THE INVENTION

This invention relates to a composite piston for internal combustion engines, comprising an upper part, which consists of ferrous material and is joined by a centering screw-threaded ring to a lower part of the piston.

In a piston engine, the combustion of the fuel which has been supplied is initiated in an Otto engine by an electric spark and in a diesel engine by the injection of the fuel into the air which has been highly compressed in the combustion chamber during the compression stroke. The energy which is originally present as chemical energy is converted by the combustion almost entirely into thermal and pressure energy. Thereafter, about one-third of the energy is is converted by means of the piston and the power train into mechanical energy. It is known that owing to thermodynamic effects which are not explained here in detail, the remaining two-thirds of the supplied energy is dissipated in approximately equal parts in the coolant and the exhaust gases.

There is a considerable desire in the art to minimize that part of the energy content of the combustion gases which is transferred to the coolant. This could be accomplished by the provision of a piston head consisting of a material which combines a low thermal conductivity with high heat resistance and high mechanical strength. The materials previously for this purpose do not meet these requirements. For instance, ceramic materials have no optimum mechanical strength properties and high-temperature steels have a relatively high thermal conductivity.

SUMMARY OF THE INVENTION

It is an object of the present invention to provide a piston which is of the kind described first hereinbefore and in which a much smaller part of the energy contained in the combustion gases is transferred to the coolant.

This object is accomplished in that the screw-threaded ring is provided near its lower rim with internal screw threads and near its upper rim with an internal annular rib, the lower part of the piston has near its upper rim a corresponding annular recess, and the screw-threaded ring is screwed onto the upper rim of the lower part of the piston in such a manner that the internal annular rib is received by a corresponding annular recess at the upper rim of the upper part of the piston and defines an axially extending boundary surface of the annular recess and with its annular surface facing the skirt of the piston is forced against the confronting boundary surface of the annular recess.

As a result of these measures, the relatively high thermal conductivity of the upper part of the piston, which upper part consists of ferrous material, is compensated in that the contacting surfaces required for the conduction of heat are remote from the combustion chamber and are relatively small.

According to a further feature of the invention the ring groove for receiving the first compression ring is disposed adjacent to the internal annular rib slightly below the top edge of the top land in order to minimize the annular clearance between the top land and the cylinder liner. This feature can only be embodied because the area of the contact surfaces between the upper part of the piston and the screw-threaded ring is decreased so that the function of the compression ring is not adversely affected.

The conduction of heat can be further decreased in that a heat-insulating insert is provided between that annular surface of the internal annular rib of the screw-threaded ring which faces the skirt of the piston and the annular recess in the upper part of the piston.

The conduction of heat can be further decreased in that a heat-insulating disk or ring consisting, e.g., of ceramic material is inserted between the upper and lower parts of the piston. A disk for that purpose may also serve to separate the cavity in the upper part of the piston from the cooled lower part.

In order to prevent an ingress or penetration of combustion gases into the gap between the inner axial surface of the internal annular rib and the opposite surface of the annular recess, the internal annular rib is provided at its upper rim with a lip, which shields the gap from the combustion chamber.

Sealing elements may be provided in the gap.

In accordance with a desirable further feature of the invention, that surface of the annular recess which faces that surface of the internal annular rib if the screw-threaded ring which faces the skirt of the piston is designed as a centering surface so that the components are centered and held against displacement.

Illustrative embodiments of the invention will be explained in more detail hereinafter with reference to the attached drawings wherein:

DETAILED DESCRIPTION OF THE INVENTION

Figure 1:
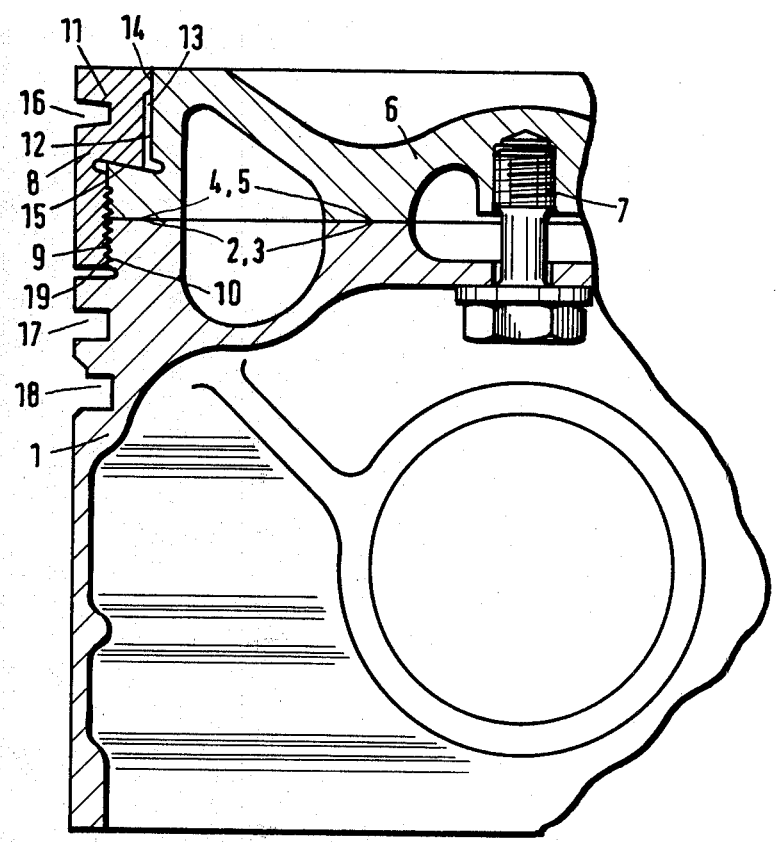
FIG. 1 is a partial sectional view of a portion of a piston according to the invention.

FIG. 1 shows a composite piston for a diesel engine with direct fuel injection. The lower part 1 of the piston is supported by annular ribs 2, 3 bearing on corresponding ribs 4, 5 of the upper part 6 of the piston. The two parts of the piston are forced against each other by a central screw-threaded joint 7. The screw-threaded ring 8 is provided on the inside of its lower rim with internal screw threads 9 and with these screw threads are screwed into the annular recess 10 at the upper rim of the lower part 1 of the piston. The upper rim of the screw-threaded ring 8 is provided with an internal annular rib 11, which extends into the annular recess 12 formed at the upper rim of the upper part 6 of the piston. There is a gap 13 between the axially extending surface of the internal annular rib 11 and the confronting surface of the annular recess 12. That gap 13 is shielded from the combustion chamber by a lip 14 provided at the upper edge of the internal annular rib 11. That annular surface 15 of the internal annular rib 11 which faces the skirt of the piston is forced against the mating boundary surface of the annular recess. The annular groove 16 for the first compression ring is disposed adjacent to the internal annular rib 11 slightly below the top edge of the top land. The annular grooves 17, 18 for the second compression ring and the oil scraper ring are formed in the lower part 1 of the piston.

Because that annular surface 15 of the internal annular rib 11 which faces the skirt of the piston and the mating boundary surface of the annular recess is inclined to the surface of rib 2 of the piston, the parts 1, 6 of the piston are centered as they are forced against each other. There is no connection between that surface 19 of the screw-threaded ring 8 which faces the skirt of the piston and the first ring-groove defining land.

Figure 2:
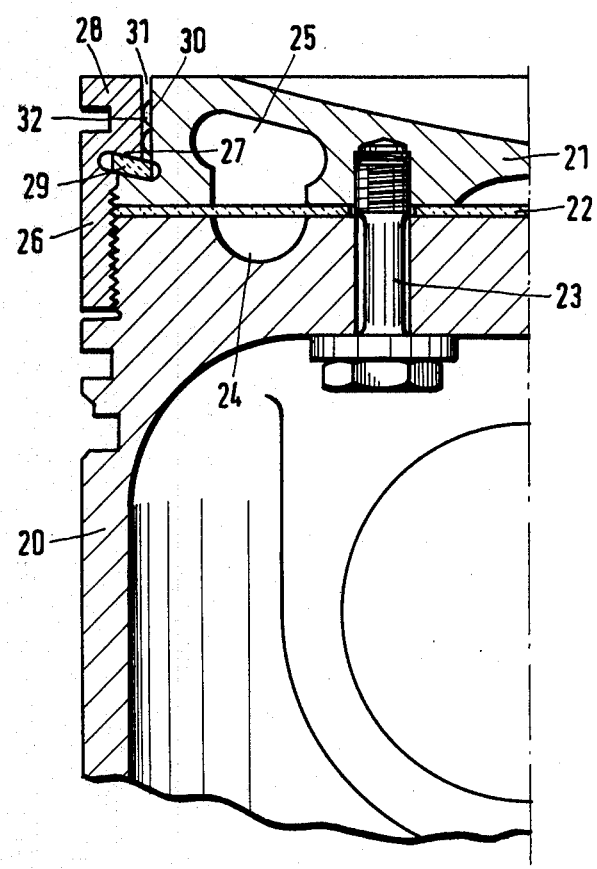
FIG. 2 is a partial sectional view of a portion of a piston according to another embodiment of the invention.

In the composite piston shown in FIG. 2, a heat-insulating disk 22 is disposed in the parting plane between the lower part 20 and the upper part 21, which are forced against each other by a plurality of screws 23. The heat-insulation disk 22 separates the the cavities 24 in the lower part 20 of the piston from the cavities 25 in the upper part 21. The screw-threaded ring 26 has been screwed to the upper and lower parts of the piston. A ring 29 of heat-insulating material is inserted at that annular surface 27 of the internal annular rib 28 of the screw-threaded ring which faces the skirt of the piston. The gap 31 between the axially extending annular surface of the internal annular rib 28 and the confronting boundary surface of the annular recess 30 in the upper part of the piston is closed by sealing elements 32.

What is claimed is:

1. In a composite piston for internal combustion engines having a lower part with an upper rim and an upper part with an upper rim, the upper part composed of ferrous material and joined together with the lower part by a centering screw-threaded ring having an upper rim and a lower rim, the improvement wherein the screw-threaded ring comprises internal screw threads adjacent the lower rim thereof and an internal annular rib adjacent the upper rim thereof, the lower part of the piston has a corresponding annular recess adjacent its upper rim configured to enable the screw-threaded ring to be screwed onto the upper rim of the lower part of the piston and the upper part has an annular recess in the upper rim thereof configured to receive the internal annular rib when the screw threaded ring is screwed onto the lower part, with the axially extending and readily extending boundary surfaces of the internal rib forced against the confronting boundary surfaces of the annular recess of the upper part and wherein the internal annular rib includes a lip at its upper edge to define a gap between a portion of the axially confronting surfaces and which shields the gap from the combustion chamber.

2. The piston according to claim 1, further comprising a ring groove for receiving the first compression ring disposed adjacent to the internal annular rib slightly below the top edge thereof.

3. The piston according to claim 1, wherein the radially confronting surfaces are inclined with respect to the plane normal to the longitudinal axis of the piston to effect centering when the screw threaded ring is tightened.

* * * * *